July 26, 1966
R. G. BEAVERS
3,262,271
THRUST REVERSER
Filed July 30, 1965
2 Sheets-Sheet 1
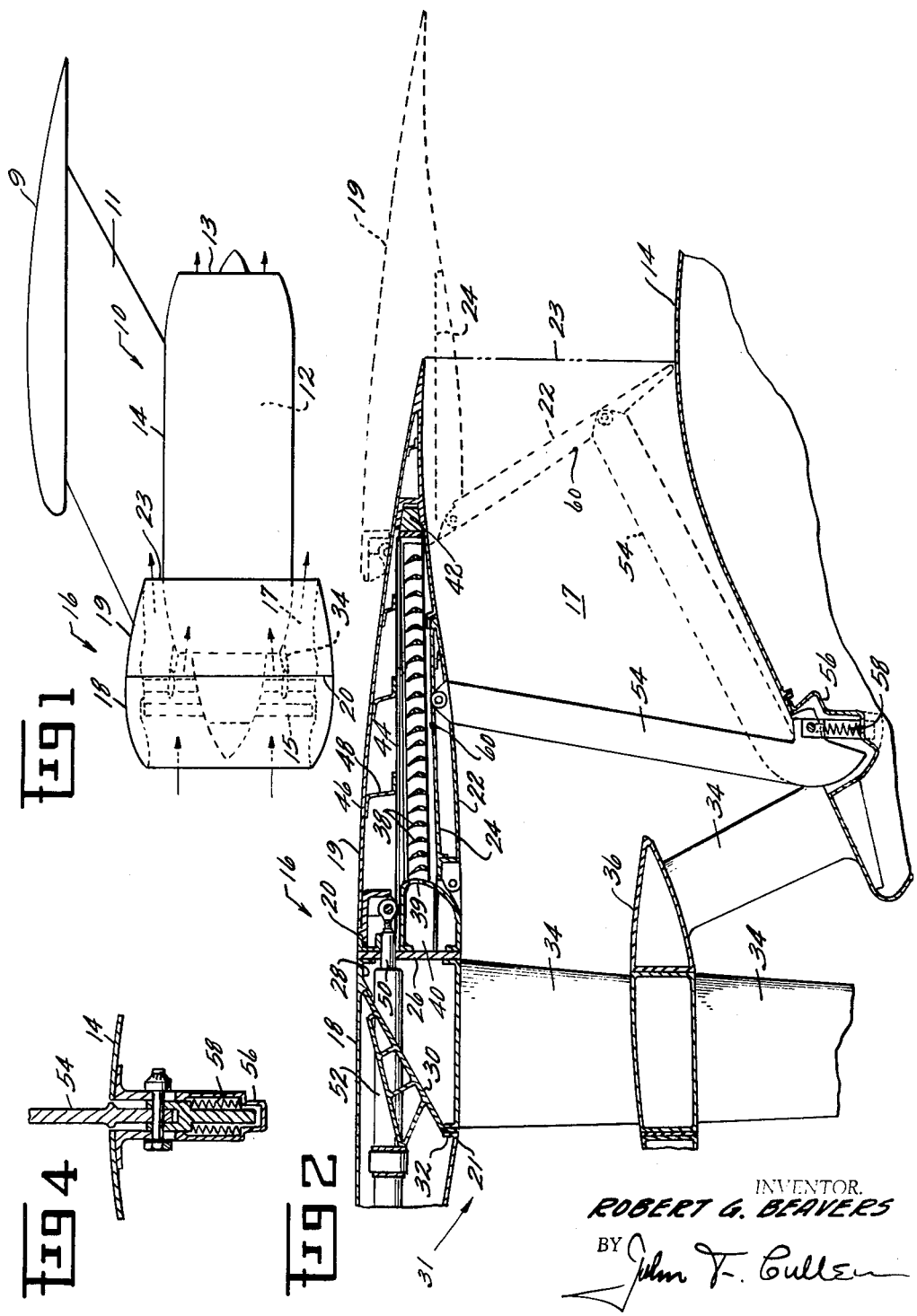
INVENTOR.
ROBERT G. BEAVERS
BY John F. Cullen
ATTORNEY July 26, 1966   R. G. BEAVERS   3,262,271
THRUST REVERSER Filed July 30, 1965   2 Sheets-Sheet 2

INVENTOR.
ROBERT G. BEAVERS
BY
ATTORNEY

United States Patent Office 3,262,271
Patented July 26, 1966

3,262,271
THRUST REVERSER
Robert G. Beavers, Mason, Ohio, assignor to General
Electric Company, a corporation of New York
Filed July 30, 1965, Ser. No. 476,100
12 Claims. (Cl. 60—35.54)

The present invention relates to a thrust reverser mechanism and, more particularly, to a thrust reverser mechanism that is particularly applicable to bypass type fan engines.

With the advent of the fan engine, whether forward or aft fan, it has become necessary to supply a thrust reverser mechanism to reverse the fluid flow through the generally annular cross-section of the bypass duct. Because the use of fans with conventional jet engines results in larger diameter engines or cruise fans, it is desired to provide a reverser mechanism that does not add to an already large diameter. Furthermore, because the engines become large and the reversing operation must be carried out on a relatively large periphery, it becomes important that the reversing structure be lightweight and straightforward and simple in operation. The high bypass ratio turbofan of up to 8 to 1 and above, is a fan engine in which a very large quantity of the propulsive fluid is sent through the annular bypass duct. In such engines, it may be possible to reverse only the bypass flow since the flow through the jet engine whether concentric or remote is a proportion as small as 10%–15% of the total flow. Reversing efficiently only the bypass flow in such high bypass ratio engines is sufficient to obtain the reversing necessary to meet specifications.

It is well understood that thrust reversers must perform two functions. They must stop the flow and they must turn the flow into the reverse direction. It is desired to do this where there is as little disturbance or change as possible in the normal aerodynamic members that are required for other engine functions.

In most of the present type thrust reversers, the aircraft geometry has been compromised to reflect the physical mass of the reverser unit. As stated above, it is desired to provide a reverser that will fit the aircraft structure as it exists for other aerodynamic functions. It is also important that a thrust reverser be capable of supplying good thrust modulation characteristics to provide for immediate and full thrust in the case of a wave-off or go-around condition during a landing operation. Also the reverser must not interfere with the operation of the engine by causing overspeed or stalling when actuated. In other words, it is desirable that the engine be kept operating at its full rotating speed and that the thrust reverser be able to move quickly from the forward to reverse position and back again without changing the loading of the fan or gas generator. Furthermore, the thrust reverser should be fail-safe so that it will stay in the reverse thrust position in the event of structural failure while the reverser is being used as a landing roll reverser.

The main object of the present invention is to provide a thrust reverser that is applicable to high bypass ratio turbofan engines and which splits the functions of the thrust reverser both functionally and structurally.

A further object is to provide such a reverser which employs substantially the existing fan structure without compromising any of the aerodynamic characteristics desired for other functions.

A further object is to provide such a reverser in which it is unnecessary to provide the usual sealing structure in intermediate positions and which uses predetermined gaps determined by controllably actuated blocker structure that completely seals in a fully reversed position.

Another object is to provide such a reverser wherein the airflow is assisted to provide a smooth flow through the reverser and avoid any back pressure effects on the fan.

A further object is to provide a reverser wherein the blocking flaps are disposed upstream of the throat so that any pressure losses are in the low velocity section and minimized.

Another object is to provide such a reverser in which fixed cascades are employed so that the large pressure loads imposed on the engine structure may be taken by the heavy fixed frame-type structure normally present.

A further object is to provide such a reverser wherein the fixed cascade structure is used in conjunction with blocker flaps that close the bypass duct and the flaps are linked to an inner wall in such a manner as to reduce the loads on the actuating means by an order of magnitude.

A further object is to provide a reverser wherein the blocker flaps acting in conjunction with a curved flow guide means permits the flaps to be short and obviates the need for sealing means between flaps.

Briefly stated, the invention is directed to use in a jet propulsion powerplant of the front fan high bypass ratio type having an inner wall and a fan concentric therewith and extending radially beyond the wall. This may be an aft or forward fan engine when the wall encloses an engine. A thrust reverser mechanism is provided in a cowling surrounding the fan and spaced from the wall to form a bypass duct. The cowling is conveniently split into fixed forward and translating aft abutting cylindrical portions which form inner and outer flow surfaces when closed in cruise position. The forward portion is provided with peripherally spaced beam support means fixed thereto and extending downstream. The aft portion may have dual inner and outer walls for stiffness and for cooperation with the beam support means for guiding the aft portion in addition to providing the flow surfaces. A ring joins the downstream ends of the support means and a box-like structure is thus provided. A plurality of flow reversing cascades are peripherally disposed in the box and fixed to the support means. The aft cowling portion is supported and carried on the beam means by at least one of the dual walls and telescopes over the cascades when it abuts the forward portion. There is provided a plurality of peripherally disposed blocker flaps that are pivoted at their upstream ends to the aft cowling portion and are designed to nest in a recess in the inner surface of the aft cowling to form part of the inner flow surface in cruise position under the cascades. Actuating means are disposed in the cowling with an actuator in the forward portion of the cowling which is connected to an actuation member on the forward end of the aft portion to translate the aft cowling member downstream. A link is connected to each flap and the inner wall to pull the flaps into substantial edge abutment with each other and block the duct to reverse the duct flow. In the reverse position a flow guide means is provided, fixed to the forward portion and rounded in an extension toward the cascades, to guide the airflow into the cascades and avoid back pressure on the fan. Reduction of undesirably high loading forces is obtained by pivoting the links downstream of the center of pressure of the flaps to further coact with the fixed cascade in transmitting the loads to substantial frame portions and thus minimize the actuator size and weight. By making the fixed downstream portion of smaller diameter a convergent nozzle is formed. Locating the flaps well downstream permits shorter flaps to act with the rounded guide means to minimize sealing for smooth reverse flow. In order to prevent movement of the flaps into the bypass duct and buckling of the links under gyroscopic loading, the links are biased to force the flaps into the recesses in cruise position.

While the specification concludes with claims particularly pointing out and distinctly claiming the subject matter which is regarded as the invention it is believed the invention will be better understood from the following description taken in connection with the accompanying drawings, in which:

FIGURE 1 is a plan view of a typical front fan powerplant supported from an aircraft wing and employing the instant invention;

FIGURE 2 is an enlarged cross-sectional view in the area of the reverser showing the reverser mechanism in cruise position with the primary elements dotted in the reverse thrust position;

FIGURE 4 is a partial cross-sectional view illustrating a typical biasing arrangement for the flap linkage.

Figure 3:
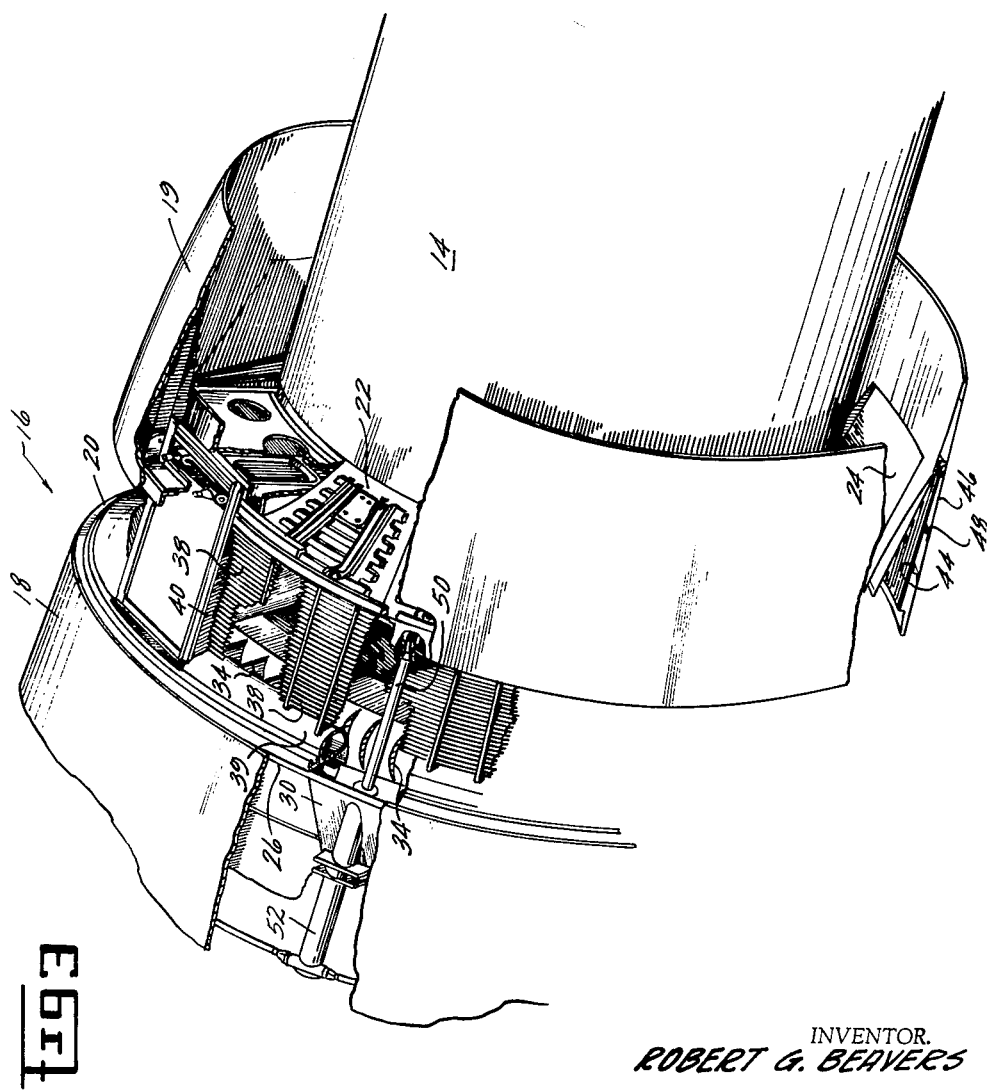
FIGURE 3 is a partial perspective view omitting some parts for clarity and showing the thrust reversing mechanism in reversing position.

It should be understood that the front fan high bypass ratio powerplant is described for illustration and the invention is equally applicable to aft fan powerplants as well as cruise fans. Also, the invention is described in connection with a front fan powerplant with a concentric jet engine wherein the fan cowling does not extend completely back to the rear of the jet engine wall although the invention is equally applicable to such an installation. High bypass ratio fans are those in which the ratio of the fluid passing through the fan to the jet engine may be as high as 8 to 1 or above. In such installations it may be necessary to reverse only the fan flow for satisfactory performance and the jet engine exhaust may be ignored.

Referring first to FIGURE 1, there is shown a front fan powerplant of the general type that might employ the instant invention. To this end, an aircraft structure such as wing 9 may support an engine generally indicated at 10 by means of a conventional strut or pylon structure 11. Engine 10 may be of the front fan concentric type as shown in FIGURE 1 which employs an inner jet engine 12 discharging through a nozzle 13 to provide thrust. The jet engine is enclosed within a wall 14 in the conventional manner. While described in connection with a concentric fan jet engine it should be noted that wall 14 may be the wall of a plug in a pure cruise fan fed from a remote gas generator in a well known manner. For convenience of description, the concentric arrangement will be described. In order to provide additional thrust in the well known manner, a fan 15 concentric with the engine and extending radially beyond the wall 14 is provided. The fan 15 is surrounded by cowling 16 which is larger in diameter than the engine and spaced from the engine wall 14 to form a bypass duct 17 for the additional thrust by movement of relatively large masses of lower velocity air in the well known manner. As explained above, in the high bypass ratio type powerplant this mass of air may be as high as eight or greater times the amount of airflow through the engine 12. The fan air is thus used to propel fluid through the duct 17 as well as to supercharge the engine 12.

In order to provide a simplified and lightweight reverser for the fan structure and bypass flow it is advantageous to make direct use of the cowling 16 as part of the reverser mechanism. At the same time, it is desired that cowling 16 be kept as thin as possible for desired aerodynamic reasons. For this reason, and to avoid compromising the physical characteristics of the engine geometry, the present invention splits the reverser functionally and structurally.

The two functions that a reverser must perform are (1) stopping the flow and (2) turning the flow. The present invention provides structure to perform both of these functions and splits the structure so that two separate but interconnected systems primarily disposed within the cowling perform the two functions and still maintain the aerodynamic features of the engine substantially undisturbed. Additionally any minor disturbance is conveniently maintained upstream of the nozzle throat in the subsonic flow region where the pressure losses are minimized.

The present invention is an improvement on co-pending application, Serial No. 462,790, filed June 7, 1965, and assigned to the same assignee. That invention located all of the mechanism in the outer cowl and it contains a two-part cowl structure. The present invention uses a similar but more simplified cowl structure, and reduces the loads imposed on the prior structure by putting a small part of the actuation mechanism in the form of links in the fan stream. The desirable feature of a fixed cascade to permit the heavy loads imposed thereon to be transmitted to fixed frame-like structure is also provided.

Referring next to FIGURE 2, it will be seen that cowling 16 is split peripherally around itself into a forward portion 18 and an aft portion 19. These portions may be generally seen in FIGURE 1. In the cruise position, the forward and aft portions 18 and 19 are substantially cylindrical and abut and seal generally along line 20. It will be seen that both portions form the inner and outer flow surfaces in the cruise position of FIGURE 2. The aerodynamically smooth cowling structure required for cruise is thus provided by the forward fixed cowling portion 18 in conjunction with an inner surface 21 and the aft movable cowl 19 which provides both inner and outer flow surfaces as shown.

In order to reverse the flow through duct 17 it is necessary first to block the flow. To this end, there is provided a plurality of peripherally disposed blocker flaps 22 of isosceles trapezoid shape that are pivoted at their upstream ends to the aft cowling portion 19 and nest therein in a recess 24 to form, with the cowling portion, part of the inner flow surface in the cruise position as shown. It will be appreciated that the cowl portion 19 is translatable and movable and is thus provided of a suitable axial length. Conveniently, hollow thin skin structure is provided for lightweight and to ensure smooth flow surfaces. It is to be noted that the upstream pivoting of blocker flaps 22 provides that the flaps may immediately be retracted in the event of a wave-off in a landing operation resulting in immediate full thrust from the powerplant. Further, engine wall 14 and the trailing edge of the aft cowling portion 19 may form a converging nozzle with throat 23 therebetween.

In order to store flaps 22 they are designed to be retractably nested in the recess 24 to form a smooth inner wall surface in the cruise position as shown in FIGURE 2. It will be apparent then that the flaps 22 are disposed in a subsonic velocity or lower pressure region so that any losses due to interruptions in the smooth flow surface when the flaps are nested are minimized by location of the flaps upstream of the nozzle 23. It will be apparent also that these flaps 22 may be quite thin and thus easily actuated to form the smooth flow surface necessary in the FIGURE 2 cruise position. Movement of flaps 22 into duct 17 by an arrangement to be described then blocks the flow.

Because of the heavy loads imposed during reverse thrust, it is desirable that substantial structural members be used as much as possible. To this end, the forward fixed cowling portion 18, as part of the substantial structural frame, has a fixed flange 26 that may be in the form of a disc and to which is bolted an angled extension 28 for strength. Extension 28 is supported by a cone member 30 from the front flange 32 of the fan stator assembly. In other words, this is the basic fixed supporting structure through which the loads are to be taken. The whole outer cowling assembly is then supported from the central engine wall 14 through struts 34 and splitter 36 as appropriate.

Thus far described, there is provided a structure of a forward fixed cowling 18 and an aft movable cowling 19. The fixed structure is carried on the large sturdy fan stator assembly 31 made up of the individual members referred to above to provide a substantially rigid and lightweight construction.

The second function of reversing the flow is obtained by means of a fixed ring of flow reversing cascades 38 that are fixed to and extend aft from forward cowl portion 18 as shown. It can be seen that these cascades, since they are fixed and do not move, may be relatively thin and simple in construction and easily fit into the thin cowling structure 16. The reversing function is then performed by these cascades 38 which, in an installation as shown in FIGURE 1, may preferably extend substantially around the periphery although not limited to a complete peripheral arrangement as shown by conventional bulkheads used in the pylon, as seen in FIGURE 3. A suitable guide such as curved flow guide 39 fixed to the forward portion directs the flow smoothly into the cascades to avoid back pressuring on the fan due to flow separation.

In order to support the cascades and the rest of the structure downstream of the forward portion through the sturdy struts 34, the forward portion, as noted above is supplied with the fixed flange 26 as one of the main load and stiffening members. From this flange 26, there is provided peripherally spaced beam support means 40 suitably fastened to the flange 26 and these beams extend aft in a finger-like fashion. To provide stiffness and to form a box-like structure with the beams and the forward flange 26, there is provided a ring member 42 joining the downstream ends of the beams. This arrangement provides a series of rectangular openings or a box-like structure. Into the openings of this box-like structure the plurality of cascades 38 are suitably fastened to provide an overall rigid and lightweight construction. Any damaged cascades in this lattice work or a desire for different orientation is easily handled by replacing the individual cascades 38 as will be apparent. Attaching the cascades to the beams 40 by suitable bolts provides for easy replacement.

When reversal is not desired it is necessary that the aft cowl portion 19 be designed to telescope over cascades 38 so that the cascades are covered or completely surrounded by the aft cowl 19 in the cruise position as shown in FIGURE 2. To this end, aft cowl 19 is formed to dual inner wall 44 and outer wall 46 members respectively with stiffeners 48 as shown in FIGURE 2. This dual construction permits the use of very lightweight metal and the inner wall 44 may ride on the upper surface of beams 40 that extend into the aft cowl portion. In other words, the beams and the inner wall 44 cooperate to form a sliding track to telescope the aft portion over the cascades 38.

To move the parts, there is provided a suitable arrangement including an actuating member 50 that is connected to the forward end of the aft portion and may form part of the structure of the aft cowl to move with it. Any suitable actuator 52 may be supplied and connected to the actuating member 50 and the actuator may be electrical, pneumatic or any well known device. Suffice to say that it is adequate to translate the cowl portion aft and uncover the cascades 38.

In order to reduce the heavy duty actuating structure that may be required due to high loads on the blocker flaps when they are in blocking position as shown in FIGURE 2, there is provided a link 54 connected to each flap and wall 14 to pull the flap inward into substantial edge abutment and end abutment on wall 14 upon translation of actuating member 50. Predetermining the gaps between flap edges provides an adequate seal in blocking position. A suitable circular section 56 may cooperate with a corresponding opening in wall 14 to minimize the aerodynamic disturbance. Naturally links 54 are suitably streamlined to present minimum aerodynamic drag during the cruise operation.

In order to avoid undue strain and aerodynamic disturbance during gyroscopic loading, it is desirable that the links 54 be biased to maintain the flaps in the closed position during cruise operation. To this end, as shown in FIGURE 4, the links may be conveniently biased by spring means 58 from one of the walls as inner wall 14. This results in an outward bias on link 54 tending to maintain the flaps 22 in the closed position at all times and minimize any buckling or compression loads on the links 54.

To further reduce the loads and provide some balancing, the links 54 are preferably pivotally connected near and downstream of the center of pressure 60 of each flap as shown in FIGURE 2. This reduces the horizontal force component in the downstream direction that is applied to actuating member 50 so that the heavy blocker door loads pass through link 54 and into the wall 14 of engine 10 where they can be handled.

It will be apparent that the reverser thus described, with its fixed cascades, imposes the heavy loads on substantial frame structure where it can be taken. Additionally, the translatable cowling 19 may be maintained thin and lightweight and still permit the reversing function to be performed substantially within the cowling and the blocking function to be performed by structure that may be easily stowed within thin cowling. The individual cascades 38 are fixed and easily replaceable. They are simple, lightweight, and of thin construction and perform only a reversing function in a strong lattice box-like structure. The blocking function is then performed by the blockers 22 separately from the reversing function and conveniently and aerodynamically placed in the cowling in the low pressure region to minimize pressure losses. Preferably, the reverser may operate very fast as a two-position on-off reverser or can be scheduled, if appropriate, to operate at intermediate positions.

While there have been described a preferred form of the invention, obvious equivalent variations are possible in light of the above teachings. It is therefore to be understood that within the scope of the appended claims, the invention may be practiced otherwise than as specifically described, and the claims are intended to cover such equivalent variations.

I claim:

1. In a jet propulsion powerplant of the fan type having an inner wall and a fan concentric therewith and extending radially beyond said wall, thrust reverser mechanism comprising:
   a cowling surrounding said fan and spaced from said wall to form a bypass duct,
   said cowling being split into fixed forward and translatable aft abutting portions forming inner and outer flow surfaces in cruise position,
   a fixed ring of flow reversing cascades disposed within said aft portion,
   an actuation member connected to and movable with said translatable portion,
   a plurality of peripherally disposed blocker flaps pivoted at their upstream ends to said aft portion and forming part of the inner flow surface of said duct under said cascades in cruise position,
   actuating means disposed in said cowling and connected to said actuation member for translation of said member downstream, and
   link means connected to said flaps and said wall for guiding said flaps into duct blocking position and reversing the duct flow.

2. Apparatus as described in claim 1 wherein said cascades are fixed to said forward portion and beam supporting means are connected to said forward portion and extend into said aft portion to support and translate said aft portion over said cascades into abutting position with said forward portion, and
   flow guide means fixed to said forward portion and extending toward said cascades to guide flow into said cascades.

3. Apparatus as described in claim 1 wherein strut means is provided connected to said wall upstream of said flaps for support of said cowling and transmission of thrust reverse loads through said cowling to said wall.

4. Apparatus as described in claim 1 wherein said aft cowling portion and well form a nozzle in the abutting position.

5. Apparatus as described in claim 1 wherein said blocker flaps are formed as isosceles trapezoids with predetermined gaps therebetween during movement across said duct to substantially abut each other along the edges in fully extended position touching said wall, and said translatable cowling is formed of dual walls and shaped to form a recess for resting of said flaps in retracted position.

6. Apparatus as described in claim 5 wherein said links are biased to force said flaps into said recesses in cruise position.

7. In a jet propulsion powerplant of the front fan high bypass ratio type having an inner wall and a fan concentric therewith and extending radially beyond said wall, thrust reverser mechanism comprising,
a cowling surrounding said fan and spaced from said wall to form a bypass duct,
said cowling being split into fixed forward and translatable aft abutting cylindrical portions forming inner and outer flow surfaces in cruise position,
said aft portion having dual inner and outer walls,
peripherally spaced beam support means fixed to said forward portion and extending aft,
a ring member joining the downstream ends of said support means,
a plurality of flow reversing cascades peripherally disposed between and fixed to said support means,
said aft cowling portion being supported and carried on said beam means and telescoping over said cascades when abutting said forward portion,
an actuation member connected to the forward end of said aft portion and movable with said translatable portion,
a plurality of peripherally disposed blocker flaps pivoted at their upstream ends to said aft portion and forming part of the inner flow surface of said duct under said cascades in cruise position,
actuating means disposed in said cowling and connected to said actuation member for translation of said member downstream, and
link means connected to said flaps and said wall for guiding said flaps into duct blocking position and reversing the duct flow.

8. Apparatus as described in claim 7 having curved flow guide means fixed to said forward portion and extending toward said cascades to guide flow into said cascades.

9. Apparatus as described in claim 7 wherein strut means is provided connected to said well upstream of said flaps for support of said cowling and transmission of thrust reverse loads through said cowling to said wall.

10. Apparatus as described in claim 7 wherein said aft cowling portion and wall form a nozzle in the abutting position.

11. Apparatus as described in claim 7 wherein said blocker flaps are formed as isosceles trapezoids with predetermined gaps therebetween during movement across said duct to substantially abut each other along the edges in fully extended position touching said wall, and said translatable cowling is formed of dual walls and shaped to form a recess for nesting of said flaps in retracted position.

12. Apparatus as described in claim 11 wherein said links are biased at said wall connection to force said flaps into said recesses in cruise position.

References Cited by the Examiner

UNITED STATES PATENTS

| | | |
|---|---|---|
| 2,847,823 | 8/1958 | Brewer. |
| 3,032,981 | 5/1962 | Lawler _____ 60—35.54 |
| 3,036,431 | 5/1962 | Vdolek _____ 60—35.54 |
| 3,068,646 | 12/1962 | Fletcher _____ 60—35.54 X |
| 3,113,428 | 12/1963 | Colley et al. _____ 60—35.6 X |

FOREIGN PATENTS 955,518    4/1964    Great Britain.

MARK NEWMAN, *Primary Examiner.*
C. R. CROYLE, *Assistant Examiner.*